United States Patent
Yoo et al.

(10) Patent No.: US 9,493,644 B2
(45) Date of Patent: *Nov. 15, 2016

(54) RESIN BLEND

(71) Applicant: LG CHEM, LTD., Seoul (KR)

(72) Inventors: Houng Sik Yoo, Seoul (KR); Han Na Lee, Daejeon (KR);
(Continued)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/285,784

(22) Filed: May 23, 2014

(65) Prior Publication Data
US 2014/0255699 A1    Sep. 11, 2014

Related U.S. Application Data

(63) Continuation of application No. PCT/KR2012/010059, filed on Nov. 26, 2012.

(30) Foreign Application Priority Data

Nov. 25, 2011  (KR) .................. 10-2011-0124654

(51) Int. Cl.
*C08L 33/12*    (2006.01)
*B32B 27/30*    (2006.01)
(Continued)

(52) U.S. Cl.
CPC ............. *C08L 33/12* (2013.01); *B32B 27/08* (2013.01); *B32B 27/308* (2013.01); *C08L 33/06* (2013.01);
(Continued)

(58) Field of Classification Search
None
See application file for complete search history.

(56) References Cited

U.S. PATENT DOCUMENTS 5,859,176 A * 1/1999 Nakahashi et al. ........... 528/310
5,889,114 A * 3/1999 Statz .............................. 525/166
(Continued)

FOREIGN PATENT DOCUMENTS

CN    1366681 A    8/2002
CN    1620471 A    5/2005
(Continued)

OTHER PUBLICATIONS

XP-002737112: Macromolecular Materials and Engineering, Department of Plastics Engineering, University of Mass-Lowell, "Core-Sheath Structure in Electrospun Nanofibers from Polymer Blends", Wei, Jul. 2006, pp. 1307-1314.
(Continued)

*Primary Examiner* — Ronak Patel
(74) *Attorney, Agent, or Firm* — Dentons US LLP (57) ABSTRACT

Provided are a resin blend, which includes a first resin, and a second resin having hydrogen-binding donor and acceptor, and having a difference in surface energy from the first resin at 25° C. of 0.1 to 35 mN/m, and is formed in a layer-separated structure, a pellet, a method of manufacturing the same, and a resin molded article having a specific layer-separated structure. Because of the resin blend, a molded article may have enhanced mechanical properties and surface hardness, and additional surface coating may be omitted, thereby reducing a processing time, increasing productivity, and reducing production costs.

14 Claims, 3 Drawing Sheets

(72) Inventors: Jin Young Ryu, Daejeon (KR); Hyeon Choi, Daejeon (KR); Woo Sung Kim, Daejeon (KR); Eun Joo Choi, Daejeon (KR)

(51) Int. Cl.
*B32B 27/08* (2006.01)
*C08L 101/02* (2006.01)
*C08L 101/04* (2006.01)
*C08L 101/06* (2006.01)
*C08L 33/06* (2006.01)
*C08L 33/16* (2006.01)

(52) U.S. Cl.
CPC .............. *C08L 33/16* (2013.01); *C08L 101/02* (2013.01); *C08L 101/04* (2013.01); *C08L 101/06* (2013.01); *Y10T 428/2998* (2015.01); *Y10T 428/3175* (2015.04); *Y10T 428/31924* (2015.04)

(56) References Cited

U.S. PATENT DOCUMENTS

| | | | |
|---|---|---|---|
| 6,147,162 A * | 11/2000 | Tadokoro | B29C 45/14778 525/222 |
| 6,210,856 B1 * | 4/2001 | Lin et al. | 430/270.1 |
| 2003/0198769 A1 | 10/2003 | Jing et al. | |
| 2004/0049006 A1 * | 3/2004 | Aramaki et al. | 528/335 |
| 2006/0199871 A1 * | 9/2006 | Hale et al. | 521/48 |
| 2011/0166294 A1 * | 7/2011 | Brusson et al. | 525/174 |

FOREIGN PATENT DOCUMENTS

| | | |
|---|---|---|
| CN | 1784428 A | 6/2006 |
| FR | 2374361 A1 | 7/1978 |
| JP | 2007-332187 A | 12/2007 |
| JP | 2008-248072 A | 10/2008 |
| KR | 1020090049517 A | 5/2009 |
| KR | 1020090049558 A | 5/2009 |
| KR | 1020110003061 A | 1/2011 |
| KR | 1020110026318 A | 3/2011 |

OTHER PUBLICATIONS

"Surface segregation and miscibility in blends of poly(ethyl acrylate) with poly(vinylidene fluoride-co-hexafluoroacetone)", Yoshihisa Kano et al., Int. J. Adhesion and Adhesives, vol. 15, No. 4, 1995, pp. 219-224.

* cited by examiner

RESIN BLEND

This application is a bypass continuation application of International Application No. PCT/KR2012/010059, filed on Nov 26, 2012, which claims priority to and the benefit of Korean Patent Application No. 10-2011-0124654, filed Nov 25, 2011, the disclosures of which are incorporated herein by reference in their entirety.

TECHNICAL FIELD

The present application relates to a resin blend, a pellet, a method of manufacturing a resin molded article using the same, and a resin molded article.

BACKGROUND ART

A plastic resin is easily processed, has excellent properties such as tensile strength, elastic modulus, thermal resistance, and impact resistance, and is used in various applications such as automobile parts, helmets, parts of an electric appliance, parts of a spinning machine, toys, or pipes.

Particularly, resins used for home appliances, automobile parts, and toys are in direct contact with a human body, and thus should be environmentally friendly and have excellent surface hardness. However, generally, when a resin is exposed to an external environment for a predetermined time or more, the resin is degraded by oxygen, ozone, or light in the air, and thus is easily discolored. Accordingly, to improve poor weather resistance and low strength of the resin, an additional painting or plating process is generally applied to the resin. However, such a painting or plating process may reduce efficiency and economic feasibility of a process of preparing a plastic resin, and generate a large amount of harmful materials during the painting or plating process or disposal of a product.

Therefore, various methods for enhancing characteristics of the resin such as scratch resistance, thermal resistance, and weather resistance without the painting or plating process. For example, a method of adding inorganic particles into the resin to enhance physical properties such as wear resistance and hardness was suggested. However, processibility of the plastic resin may be reduced by such a method, and impact strength and glossiness may be degraded by the addition of the inorganic particles.

DISCLOSURE

Technical Problem

The present application is directed to providing a resin blend, a pellet, a method of manufacturing a resin molded article using the same, and a resin molded article.

Technical Solution

One aspect of the present application provides a resin blend including a first resin and a second resin having hydrogen-binding donor and acceptor, and a difference in surface energy from the first resin at 25° C. of 0.1 to 35 mN/m, and capable of forming a layer-separated structure.

Another aspect of the present application provides a pellet which includes a core having a first resin, and a shell which has a second resin having hydrogen-binding donor and acceptor and having a difference in surface energy from the first resin at 25° C. of 0.1 to 35 mN/m.

Still another aspect of the present application provides a resin molded article which includes a first resin layer, a second resin layer formed on the first resin layer, and an interface layer having first and second resins and formed between the first and second resin layers. The second resin layer provides the resin molded article including hydrogen-binding donor and acceptor.

Yet another aspect of the present application provides a method of manufacturing a resin molded article including forming a melt blend by melting the resin blend, and forming a layer-separated structure by processing the melt blend.

Yet another aspect of the present application provides a method of manufacturing a resin molded article which includes forming a melt blend by melting the pellet, and forming a layer-separated structure by processing the melt blend.

Hereinafter, a resin blend, a pellet, a method of manufacturing a resin molded article using the same, and a resin molded article will be described in further detail with respect to exemplary embodiments of the present application.

Figure 1:
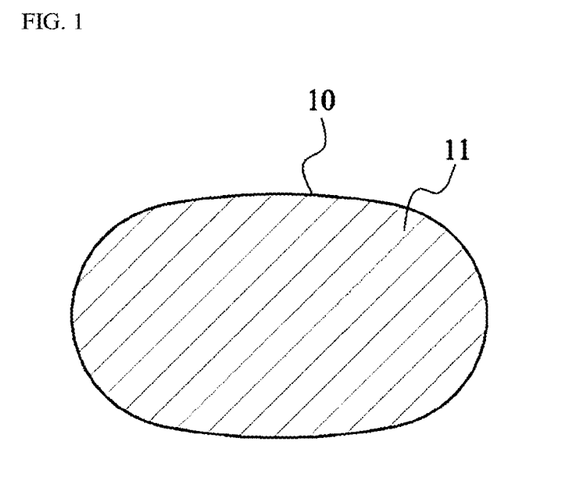
FIG. 1 is a schematic diagram of a resin blend as an example of the present application.
Figure 2:
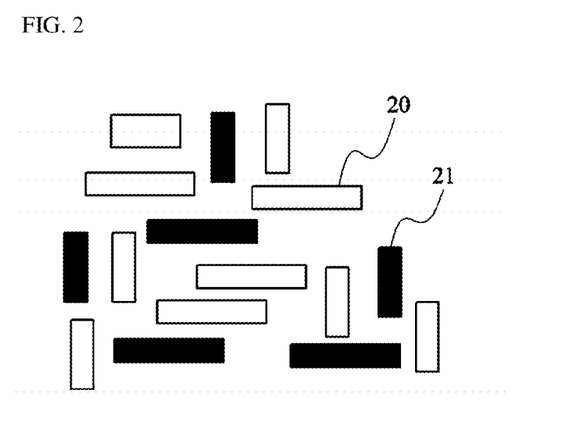
FIG. 2 is a schematic diagram of a resin blend as another example of the present application.

In the present application, the "blend" may be a mixture of at least two resins. A type of the blend may include, but is not particularly limited to, at least two resins or at least two kinds of pellets blended in one matrix. Particularly, as shown in FIG. 1, when at least two resins are blended in one matrix, a pellet 10 including a composition of at least two resins 11 may be made. Meanwhile, when at least two kinds of pellets are blended, as shown in FIG. 2, at least two kinds of pellets 20 and 21 each having one resin may be blended. The resins may have different physical properties, which may be, a surface energy, melted viscosity, solubility parameter, or a glass transition temperature.

The "melting process" refers to a process of melting a resin blend at a melting temperature (Tm) or more to form a melt blend, and forming a desired molded article using the melt blend, and is, for example, injection molding, extrusion molding, hollow molding, transfer molding, film blowing, fiber spinning, calendaring thermal molding, or foam molding.

The "resin molded article" refers to a pellet or product formed from the resin blend, and the resin molded article may be, but is not particularly limited to, for example, an automobile part, an electronic appliance part, a machine part, a functional film, a toy, or a pipe.

The "layer separation" may refer that a layer substantially formed by one resin is disposed or arranged on a layer substantially formed by a different resin. It means that, in the layer substantially formed by one resin, one kind of resin does not form a sea-island structure and is continuously present on an entire surface of one layer. The sea-island structure has a phase-separated resin partially dispersed in an entire resin blend. In addition, the "substantially formed" may mean that only one resin is present or one resin is rich in one layer.

According to the present application, the resin molded article formed from the resin blend by a melting process may have an enhanced mechanical and surface characteristics, and reduced production costs and time. For example, the resin blend of the present application may be layer-separated by a melting process, and used to manufacture a resin molded article having a specific function, for example, a high hardness, on a surface without a separate process such as coating and plating.

The layer separation of the resin blend may occur due to a difference in physical properties between the first and second resins and/or polydispersity index of the second resin. Here, the physical properties may be, for example, surface energy, melting viscosity and solubility parameters, and a glass transition temperature. However, in the present application, a blend of two resins is described, but it is obvious to those of ordinary skill in the art that layer separation can be performed by a melting process by blending three or more resins having different physical properties.

According to an exemplary embodiment of the present application, a resin blend including a first resin and a second resin having a difference in surface energy from the first resin at 25° C. of 0.1 to 35 mN/m, and capable of forming a layer-separated structure may be provided.

The difference in surface energy between the first and second resins at 25° C. may be 0.1 to 35 mN/m, 0.1 to 30 mN/m, 0.1 to 20 mN/m, 0.1 to 10 mN/m, 0.1 to 7 mN/n, 1 to 35 mN/m, 1 to 30 mN/m, 1 to 20 mN/m, 1 to 10 mN/m, 1 to 7 mN/m, or 2 to 6 mN/m. When the difference in surface energy is less than 0.1 mN/m, the first and second resins are easily mixed such that the second resin is difficult to be transferred to a surface, and thus a layer separation phenomenon is difficult to occur. In addition, when the difference in surface energy is more than 35 mN/m, the first and second resins may not be bound to each other to be separated or peeled.

The upper and/or lower limit(s) of the difference in surface energy may be an optional value in the range from 0.1 to 35 mN/m, and may be dependent on physical properties of the first resin. Particularly, when the first resin is used as a base resin and the second resin is used as a functional resin to enhance a surface characteristic of the first resin, the second resin may be selected to have a difference in surface energy between the first and second resins at 25° C. of 0.1 to 35 mN/m. In one example, the difference in surface energy may be selected in consideration of hydrophobicity of the second resin in the melt blend of the first and second resins.

The resin blend of the first and second resins having the difference in surface energy at 25° C. of 0.1 to 35 mN/m may be subjected to layer separation through a melting process. In one example, when the resin blend of the first and second resins is melted and exposed to the air, the first and second resins may be separated due to a hydrophobic difference. Particularly, since the second resin having a lower surface energy than the first resin has high hydrophobicity, the second resin is transferred to be in contact with the air, thereby forming a second resin layer toward the air. In addition, the first resin may be in contact with the second resin and disposed to an opposite side of the air. Accordingly, the layer separation between the first and second resins of the resin blend may occur.

Figure 3:
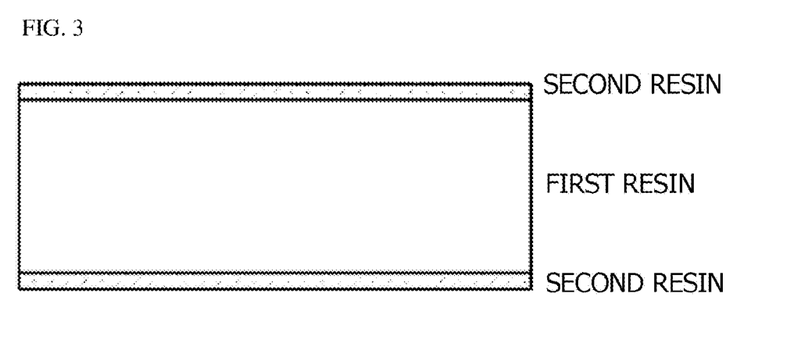
FIG. 3 is a schematic diagram of a layer-separated structure formed of a resin blend including a first resin and a second resin as an example of the present application.
Figure 4:
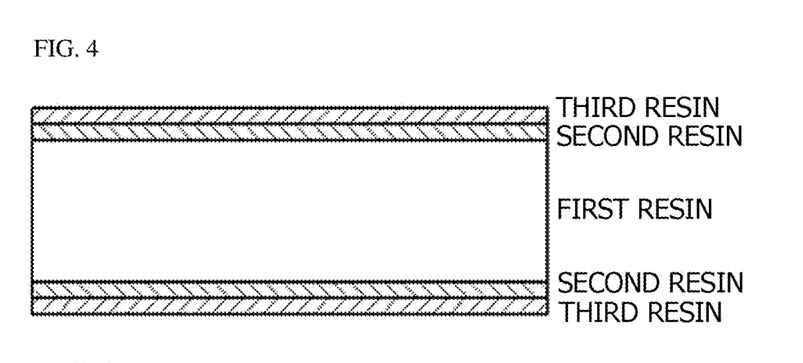
FIG. 4 is a schematic diagram of a layer-separated structure formed of a resin blend including a first resin, a second resin, and a third resin as an example of the present application.
Figure 5:
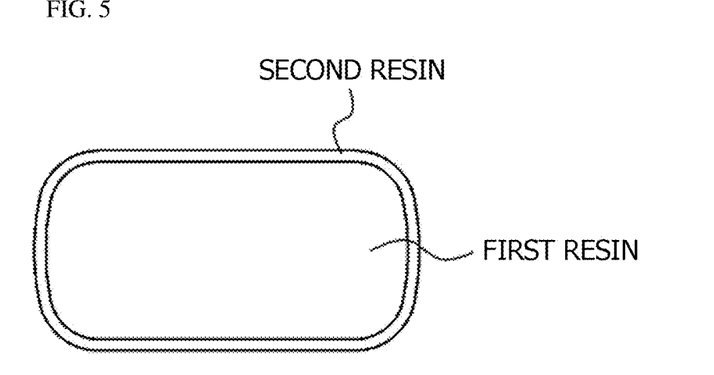
FIG. 5 is a schematic diagram of a layer-separated structure as another aspect of the present application.

The resin blend may be separated into at least two layers. In one example, the resin blend of the first and second resins may be separated into three layers, for example, as shown in FIG. 3, a second resin layer/a first resin layer/a second resin layer when two facing surfaces of the melted resin blend are exposed to the air. Meanwhile, when only one surface of the melted resin blend is exposed to the air, the resin blend may be separated into two layers, for example, a second resin layer/a first resin layer. In addition, when a resin blend including first, second, and third resins having difference in surface energy is melted, the melted resin blend may be separated into five layers, for example, as shown in FIG. 4, a third resin layer/a second resin layer/a first resin layer/a second resin layer/a third resin layer. In addition, when all of the surfaces of the melted resin blend are exposed to the air, the resin blend is layer-separated in all directions, thereby forming a core-shell structure as shown in FIG. 5.

According to another exemplary embodiment of the present application, a resin blend including a first resin and a second resin having a difference in melt viscosity from the first resin of 0.1 to 3000 pa*s at a shear rate of 100 to 1000 $s^{-1}$ and a processing temperature of the resin blend may be provided.

The difference in melt viscosity between the first and second resins may be 0.1 to 3000 pa*s, 1 to 2000 pa*s, 1 to 1000 pa*s, 1 to 500 pa*s, 50 to 500 pa*s, 100 to 500 pa*s, 200 to 500 pa*s, or 250 to 500 pa*s at a shear rate of 100 to 1000 $s^{-1}$ and a processing temperature of the resin blend. When the difference in melt viscosity is smaller than 0.1 pa*s, the first resin and the second resin are easily mixed and thus it is difficult to be easily layer-separated, and when the difference in melt viscosity is larger than 3000 pa*s, the first resin and the second resin may not be bound but may be peeled.

The upper limit and/or lower limit(s) of the difference in melt viscosity may be an optional value in the range from 0.1 to 3000 pa*s, and dependent on physical properties of the first resin. Particularly, when the first resin is used as a base resin and the second resin is used as a functional resin to enhance the surface characteristic of the first resin, the second resin may be selected to have the difference in melt viscosity between the first and second resins of 0.1 to 3000 pa*s at a shear rate of 100 to 1000 $s^{-1}$ and a processing temperature of the resin blend. As an example, the difference in melt viscosity may be selected in consideration of flowability of the second resin in the melt blend of the first and second resins.

The resin blend of the first and second resins having the difference in melt viscosity of 0.1 to 3000 pa*s at a shear rate of 100 to 1000 $s^{-1}$ and a processing temperature of the resin blend may be separated into layers due to the difference in melt viscosity after the melting process. As an example, when the resin blend of the first and second resins is melted and exposed to the air, the first and second resins may be separated due to the difference in flowability. Particularly, since the second resin having a lower melt viscosity than the first resin has high flowability, it may be transferred to be in contact with the air, thereby forming a second resin layer disposed toward the air. In addition, the first resin may be placed to an opposite side of the air while in contact with the second resin. Accordingly, the layer separation may occur between the first and second resins of the resin blend.

The melt viscosity may be measured by capillary flow, which means a shear viscosity (pa*s) according to specific processing temperature and shear rate (/s).

The "shear rate" refers to a shear rate applied when the resin blend is processed, and the shear rate may be controlled between 100 and 1000 $s^{-1}$ according to a processing method. The control of the shear rate according to the processing method is obvious to those of ordinary skill in the art.

The "processing temperature" means a temperature at which the resin blend is processed. For example, it means a temperature applied to the melting process when the resin blend is used in a melting process such extrusion or injection. The processing temperature may be controlled depending on a resin applied to the melting process such as extrusion or injection. For example, when the resin blend including a first resin of an ABS resin and a second resin obtained from a methylmethacrylate-based monomer is used, a processing temperature may be 210 to 240° C.

According to still another exemplary embodiment of the present application, a resin blend for forming a layer-separated structure, which includes a first resin and a second resin having a difference in solubility parameter from the first resin of 0.001 to 10.0 $(J/cm^3)^{1/2}$ may be provided.

The difference in solubility parameter between the first and second resins may be 0.001 to 10.0 $(J/cm^3)^{1/2}$, 0.001 to 5.0 $(J/cm^3)^{1/2}$, 0.001 to 3.0 $(J/cm^3)^{1/2}$, 0.001 to 2.0 $(J/cm^3)^{1/2}$, 0.001 to 1.0 $(J/cm^3)^{1/2}$, 0.1 to 1.0 $(J/cm^3)^{1/2}$, 0.2 to 1.0 $(J/cm^3)^{1/2}$, or 0.2 to 0.8 $(J/cm^3)^{1/2}$ at 25° C. Such a solubility parameter is an original characteristic of a resin exhibiting solubility according to polarity of each resin molecule, and the solubility parameter with respect to each resin is generally known. When the difference in solubility parameter is smaller than 0.001 $(J/cm^3)^{1/2}$, the first resin is easily mixed with the second resin, and thus the layer separation is difficult to occur, and when the difference in solubility parameter is larger than 10.0 $(J/cm^3)^{1/2}$, the first and second resins may not be bound but may be peeled.

The upper limit and/or lower limit(s) of the difference in solubility parameter may be an optional value within the range of 0.001 to 10.0 $(J/cm^3)^{1/2}$, and dependent on the physical properties of the first resin. Particularly, when the first resin is used as a base resin and the second resin is used as a functional resin to enhance a surface characteristic of the first resin, the second resin may be selected to have the difference in solubility parameter between the first and second resins at 25° C. of 0.001 to 10.0 $(J/cm^3)^{1/2}$. In one example, the difference in solubility parameter may be selected in consideration of miscibility of the second resin in the melt blend of the first and second resins.

The resin blend of the first and second resins having the difference in solubility parameter at 25° C. of 0.001 to 10.0 $(J/cm^3)^{1/2}$ may be subjected to layer separation through a melting process. In one example, when the resin blend of the first and second resins is melted and exposed to the air, the first and second resins may be separated due to a degree of the miscibility. Particularly, the second resin having the difference in solubility parameter at 25° C. of 0.001 to 10 $(J/cm^3)^{1/2}$ with respect to the first resin may not be mixed with the first resin. Therefore, when the second resin additionally has a lower surface tension or melt viscosity than the first resin, the second resin may be transferred to be in contact with the air, thereby forming a second resin layer disposed toward the air. In addition, the first resin may be in contact with the second resin and disposed to an opposite side of the air. Accordingly, the layer separation may occur between the first and second resins of the resin blend.

According to yet another exemplary embodiment of the present application, a polydispersity index (PDI) of the second resin may be 1 to 2.5, 1 to 2.3, 1.3 to 2.5, 1.5 to 2.5, or 1.3 to 2.3. The upper and lower limits of the PDI of the second resin may be optional values of 1 to 2.5.

When the PDI of the second resin is higher than 2.5, the first resin and the second resin may be easily mixed due to a low molecular weight, or the flowability of the second resin may be reduced due to a high molecular weight, resulting in difficulty in layer separation.

According to yet another exemplary embodiment of the present application, a weight average molecular weight (Mw) of the second resin of the resin blend may be 30,000 to 200,000, 50,000 to 200,000, 80,000 to 200,000, 50,000 to 150,000, 80,000 to 150,000, 50,000 to 120,000, or 80,000 to 120,000. The upper and lower limits of the weight average molecular weight of the second resin may be optional values ranging from 30,000 to 200,000.

When the weight average molecular weight is less than 30,000, the first and second resins are easily mixed, and when the weight average molecular weight is more than 200,000, the flowability of the second resin is reduced, and thus the layer separation is difficult to occur.

In addition, according to yet another exemplary embodiment of the present application, the second resin may have a higher glass transition temperature than the first resin, and a difference in glass transition temperature between the first and second resins may not exceed 30° C. The maximum value of the difference in glass transition temperature between the first and second resins may be, but is not particularly limited to, 150° C. or less.

When the glass transition temperature of the second resin is higher than 30° C. than the first resin, the second resin having a high glass transition temperature is disposed to an outer side of a resin molded article, thereby considerably enhancing a surface hardness. Particularly, as an example of the present application, when the second resin includes a hydrogen-binding functional group, the second resin may further increase a glass transition temperature, and thus a surface hardness of the final molded article may be further increased. In one example, to have a surface hardness of more than 1H or 1.5H or more, the glass transition temperature of the second resin may be controlled to 31° C. or more, 35° C. or more, or 40° C. or more, compared to that of the first resin. The surface hardness may be measured using a pencil hardness tester under a constant load of 500 g. Details on the measurement of a surface hardness can be confirmed by a method for measuring a pencil hardness described in Example.

Such a glass transition temperature of the second resin may be controlled to be included in the above-described range according to the first resin. The glass transition temperature of the second resin may be controlled to, for example, more than 100° C., 101° C. or more, 105° C. or more, or 110° C. or more. The upper limit of the glass transition temperature of the second resin may be controlled within in the range from approximately 200° C. or less or 150° C. or less, but the present application is not particularly limited thereto.

Meanwhile, the first resin is a resin mainly determining physical properties of a desired molded article, and may be selected according to a kind of a desired molded article and a process condition. As such a first resin, a general synthetic resin may be, but is not limited to, for example, a styrene-based resin such as an acrylonitrile butadiene styrene (ABS)-based resin, a polystyrene-based resin, an acrylonitrile styrene acrylate (ASA)-based resin, or a styrene-butadiene-styrene block copolymer-based resin; a polyolefin-based resin such as a high-density polyethylene-based resin, a low-density polyethylene-based resin, or a polypropylene-based resin; a thermoplastic elastomer such as an ester-based thermoplastic elastomer or an olefin-based thermoplastic elastomer; a polyoxyalkylene-based resin such as a polyoxymethylene-based resin or a polyoxyethylene-based resin; a polyester-based resin such as a polyethylene terephthalate-based resin or a polybutylene terephthalate-based resin; a polyvinylchloride-based resin; a polycarbonate-based resin; a polyphenylenesulfide-based resin; a vinylalcohol-based resin; a polyamide-based resin; an acrylate-based resin; an engineering plastic; a copolymer thereof, or a mixture thereof. The engineering plastic is a plastic exhibiting excellent mechanical and thermal properties. For example, polyetherketone, polysulfone, and polyimide may be used as the engineering plastic. In one example, as the first resin, a copolymer of a styrene-based resin and an acrylate-based resin may be used.

The second resin refers to a resin having a difference in the above-described physical properties from the first resin, and capable of providing excellent mechanical characteristics and a higher surface hardness to a surface of the desired molded article. Particularly, the second resin may include hydrogen-binding donor and acceptor, and have a higher glass transition temperature by introducing such a specific part into the second resin, thereby additionally increasing a surface hardness of a final molded article.

In the specification, as the hydrogen-binding donor, a functional group or residue including an N- or O-binding hydrogen may be used without particular limitation, and for example, may be a OH group, an $NH_2$ group, an NHR group, a COOH group, a $CONH_2$ group, an NHOH group, or a residue of an NHCO bond, an NH bond, a CONHCO bond, or an NH—NH bond in a molecule.

In addition, in the specification, the hydrogen-binding acceptor may be an N- or O-containing functional group or residue without particular limitation, for example, an OH group, an OR group, an $NH_2$ group, an NHR group, an $NR_2$ group, a COOH group, a COOR group, a $CONH_2$ group, a $CONR_2$ group, an NHOH group, an NROR group, or a residue of an NHCO bond, an NRCO bond, an O bond, an NH bond, an NR bond, a COO bond, a CONHCO bond, a CONRCO bond, an NH—NH bond, an NR—NH bond, or an NR—NR bond in a molecule. Here, R may be an aliphatic hydrocarbon, an aromatic hydrocarbon, and a derivative thereof, for example, an aliphatic hydrocarbon having 1 to 16 or 1 to 9 carbon atoms, an aromatic hydrocarbon having 5 to 30 or 5 to 16 carbon atoms and a derivative thereof. Not particularly limited to a theory, most of the hydrogen-binding donors may serve as hydrogen-binding acceptors. The hydrogen-binding donor provides a hydrogen binding to an atom having a large electronegativity, and meanwhile, a part of the atom having a large electronegativity may also serve as a hydrogen-biding acceptor. However, like a $—(NH_4)^+$ group, a functional group only serving as a hydrogen-binding donor is also present.

The increase in glass transition temperature of the second resin may be shown when the second resin includes both of the hydrogen-binding donor and acceptor.

In one example, the hydrogen-binding donor and acceptor may be present in one kind of resin. One kind of the resin including the hydrogen-binding donor and acceptor may be obtained by polymerizing a resin from a monomer including both of the hydrogen-binding donor and acceptor, or a resin from a monomer including a hydrogen-binding donor and a monomer including a hydrogen-binding acceptor. Here, one or at least two kinds of monomers may be used.

In another example, the hydrogen-binding donor and acceptor may be present in a different kind of resins. That is, a resin polymerized from a monomer including the hydrogen-binding donor may be blended with a resin polymerized from a monomer including the hydrogen-binding acceptor, and included in the second resin. Here, at least one or two or more kinds of monomers may be used.

In addition, in the second resin, when the hydrogen-binding donor and acceptor are present as one or two or more kinds of resins, a resin not including a hydrogen-binding donor and/or acceptor may be further included.

A monomer capable of providing a hydrogen-binding donor and/or acceptor to the second resin may include at least one functional group or residue of the hydrogen-binding donor and/or acceptor, for example, at least two or three functional groups or residues.

The monomer including the hydrogen-binding donor and/or acceptor may be, but is not particularly limited to, a vinyl ether such as methyl vinyl ether or ethyl vinyl ether; a nitrogen-containing monomer such as (meth)acrylamide, N-substituted (meth)acrylamide, or N,N-substituted (meth)acrylamide; vinyl acetate; a hydroxyalkyl (meth)acrylate such as hydroxy methyl(meth)acrylate, hydroxy ethyl(meth) acrylate, hydroxy propyl(meth)acrylate, hydroxy butyl (meth)acrylate, hydroxy pentyl(meth)acrylate, or hydroxy hexyl(meth)acrylate; a carboxyl group-containing monomer such as (meth)acrylic acid, 2-(meth)acryloyloxy acetic acid, 3-(meth)acryloyloxy propylic acid, 4-(meth)acryloyloxy butyric acid, an acrylic acid dimer, itaconic acid, maleic acid, or a maleic acid anhydride; or a hetero cyclic compound such as vinyl pyrrolidone, acryloyl morpholine, or a 2-ureido-4-pyrimidinone group-containing monomer.

The monomer including such hydrogen-binding donor and/or acceptor may be included in the second resin while independently, or polymerized or copolymerized with another monomer. A specific kind of the polymer included in the second resin may be, but is not particularly limited to, for example, a (meth)acrylate-based resin, an epoxy-based resin, an oxetane-based resin, an isocyanate-based resin, a silicon-based resin, a fluorine-based resin, or a copolymer thereof.

In one example, when the (meth)acrylate-based resin is included in the second resin, the monomer including the hydrogen-binding donor and/or acceptor may be included in the second resin while polymerized with a (meth)acrylic monomer. Such a (meth)acrylic monomer may be, but is not limited to, for example, an alkyl(meth)acrylate such as methyl(meth)acrylate, ethyl(meth)acrylate, propyl(meth) acrylate, butyl(meth)acrylate, cyclohexyl(meth)acrylate, octyl(meth)acrylate, lauryl(meth)acrylate, or stearyl(meth) acrylate; a fluorine-based (meth)acrylate such as perfluoromethyl (meth)acrylate, perfluoroethyl (meth)acrylate, perfluoropropyl (meth)acrylate, perfluorobutyl (meth)acrylate, perfluoropentyl (meth)acrylate, perfluorohexyl (meth)acrylate, perfluoroheptyl (meth)acrylate, perfluorooctyl (meth) acrylate, perfluoromethylethyl (meth)acrylate, perfluoroethylethyl (meth)acrylate, perfluoropropylethyl (meth) acrylate, perfluorobutylethyl (meth)acrylate, perfluoropentylethyl (meth)acrylate, perfluorohexylethyl (meth)acrylate, perfluoroheptylethyl (meth)acrylate, perfluorooctylethyl (meth)acrylate, perfluorononylethyl (meth) acrylate, perfluorodecylethyl (meth)acrylate, perfluorobutylhydroxypropyl (meth)acrylate, perfluorohexylhydroxypropyl (meth)acrylate, perfluoroethylbutylhydroxypropyl (meth)acrylate, trifluoromethyltrifluoroethyl (meth)acrylate, or tetrafluoro(trifluoromethyl) ethyl (meth)acrylate; or a glycidyl (meth)acrylate.

In another example, when the epoxy-based resin is included in the second resin, the monomer including the hydrogen-binding donor and/or acceptor may be included in the second resin while polymerized with a monomer to provide an epoxy-based resin. The epoxy-based resin may be, but is not limited to, a bisphenol-type such as a bisphenol A-type, a bisphenol F-type, a bisphenol S-type, and a hydrogenated product thereof; a novolac-type such as a phenolnovolac-type or a cresol novolac-type; a nitrogen-containing ring-type such as a triglycidylisocyanurate-type or a hydantoin-type; an alicyclic-type; an aliphatic-type; an aromatic-type such as a naphthalene-type or a biphenyl-type; a glycidyl-type such as a glycidylether-type, a glycidylamine-type, or a glycidylester-type; a dicyclo-type such as a dicyclopentadiene-type; an ester-type; or an etherester-type.

In still another example, when the oxetane-based resin is included in the second resin, the monomer including the hydrogen-binding donor and/or acceptor may be included in the second resin while polymerized with an oxetane monomer having at least one oxetane ring. Such an oxetane monomer may be, but is not limited to, for example, 1,4-bis[(3-ethyl-3-oxetanylmethoxy)methyl]benzene, di[1-ethyl(3-oxetanyl)]methylether, phenolnovolac oxetane, terephthalate bisoxetane, or biphenylene bisoxetane.

In addition, in yet another example, when the isocyanate-based resin is included in the second resin, the monomer including the hydrogen-binding donor and/or acceptor may be included in the second resin while polymerized with a monomer containing an isocyanate group. As such a monomer containing an isocyanate group, for example, diphenylmethanediisocyanate (MDI), toluenediisocyanate (TDI) or isophoronediisocyanate (IPDI) may be used, but the present application is not limited thereto.

In yet another example, when the silicon-based resin is included in the second resin, the monomer including the hydrogen-binding donor and/or acceptor may be included in the second resin while polymerized with a silicon-based monomer. A backbone of the silicon-based resin may be formed by a siloxane bond, which is a silicon-oxygen bond, and the silicon-based resin may be, but is not limited to, polydimethylsiloxane (PDMS).

In yet another example, when the fluorine-based resin is included in the second resin, the monomer including the hydrogen-binding donor and/or acceptor may be included in the second resin while polymerized with a fluorine-based monomer. The fluorine-based monomer may be, but is not limited to, a monomer classified as a fluorine-based (meth) acrylate among the above-described (meth)acrylic group monomer, tetrafluoroethylene, chlorotrifluoroethylene, fluorinated vinylidene, or fluorinated vinyl.

In one example, a monomer including a hydrogen-binding donor and/or acceptor and a polymer formed by polymerizing a (meth)acrylic group monomer may be included in the second resin. In another example, a monomer including a hydrogen-binding donor and/or acceptor, a (meth)acrylic group monomer, and a polymer formed by polymerizing a monomer of a fluorine-based (meth)acrylate may be included in the second resin. When fluorine is included in the second resin, surface energy may be controlled to be lower.

The resin blend may include 0.1 to 50 parts by weight of the second resin, or 1 to 20 parts by weight, 1 to 15 parts by weight, or 1 to 10 parts by weight with respect to 100 parts by weight of the first resin.

When the second resin is included in a smaller amount than 0.1 parts by weight with respect to 100 parts by weight of the first resin, a phase separation phenomenon does not occur, and when the second resin is included in a higher amount than 50 parts by weight with respect to 100 parts by weight of the first resin, a production cost is increased due to a high cost of the second resin.

Figure 6:
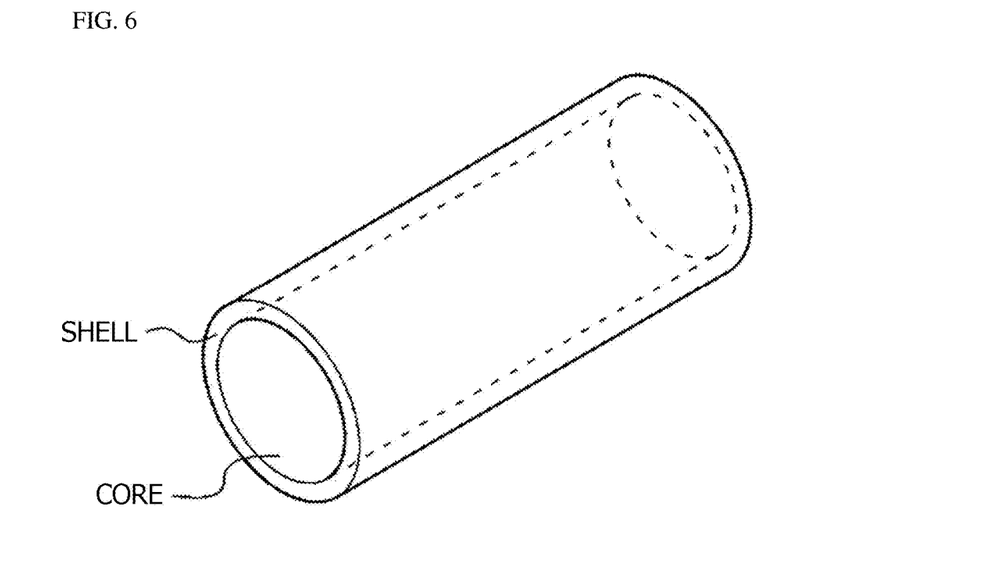
FIG. 6 is a schematic diagram of a pellet having a core and a shell.
Figure 7:
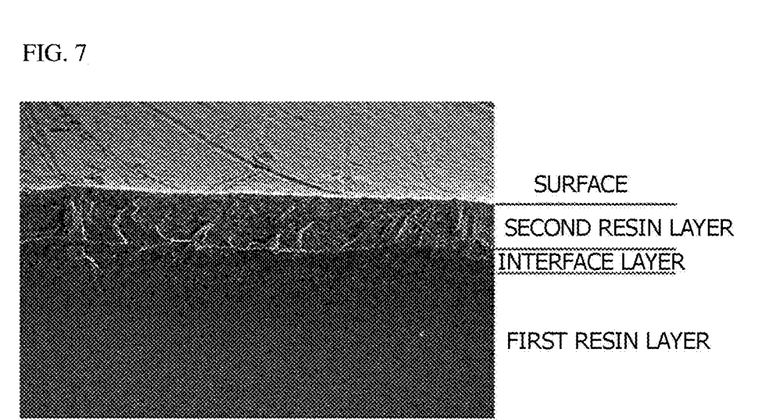
FIG. 7 is an SEM image of a layer-separated cross-section of a molded article manufactured in Example 1.
Figure 8:
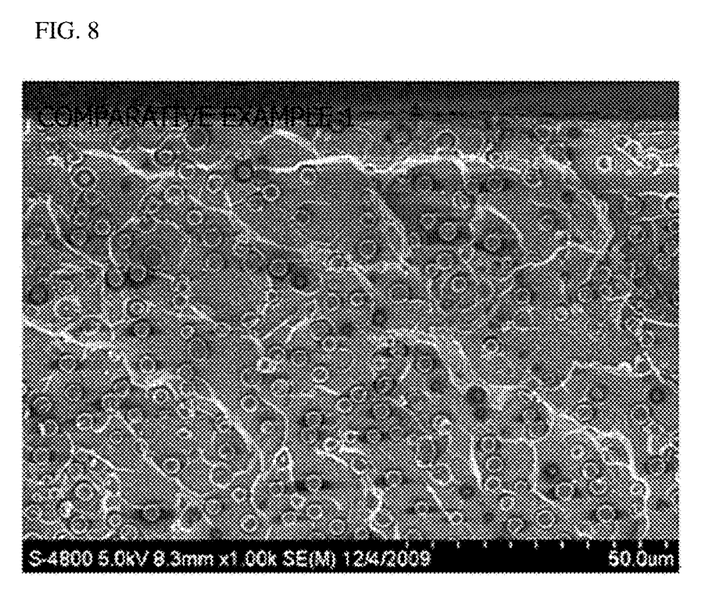
FIG. 8 is an SEM image of a cross-section of a molded article manufactured in Comparative Example 1.

The resin blend may be prepared in a pellet by extrusion. As shown in FIG. 6, the pellet prepared using the resin blend may be configured such that a first resin is disposed in the center, and a second resin is layer-separated from the first resin and disposed in a shell of the pellet.

According to one exemplary embodiment of the present application, a pellet includes a core having a first resin, and a shell which has hydrogen-binding donor and acceptor and having a difference in surface energy from the first resin at 25° C. of 0.1 to 35 mN/m.

In addition, as described above, the first and second resins may have different physical properties. For example, the first and second resins may have a difference in surface energy at 25° C. of 0.1 to 35 mN/m, a difference in melt viscosity of 0.1 to 3000 pa*s at a shear rate of 100 to 1000 s$^{-1}$ and a processing temperature of the pellet, and a difference in solubility parameter at 25° C. of 0.001 to 10.0 (J/cm$^3$)$^{1/2}$. In addition, the second resin may have a PDI of 1 to 2.5, and a weight average molecular weight of 30,000 to 200,000. In addition, the second resin may have a higher glass transition temperature than the first resin, and a difference in glass transition temperature between the first and second resins may be more than 30° C. to 150° C.

The specific kinds and physical properties of the first and second resins are described above, and thus the detailed description will be omitted.

Meanwhile, according to yet another exemplary embodiment of the present application, a method of manufacturing a resin molded article having a layer-separated structure may be provided. The method may include forming a melt blend by melting a blend of a first resin and a second resin, and forming a layer-separated structure by processing the melt blend.

As described above, due to the difference in physical properties between the first and second resins, the layer separation phenomenon may occur in the process of melting the resin blend, and a surface of the pellet or molded article may be selectively coated without a separate additional process due to such a layer separation phenomenon.

Particularly, the second resin of the present application may have a higher glass transition temperature by introducing a hydrogen-binding donor and acceptor to the second resin so that a molded article in which a high hardness resin having a relatively high glass transition temperature during layer separation is more easily disposed to a surface and thus a mechanical property and a surface characteristic are enhanced may be provided.

Meanwhile, the melting process may be performed under a shear stress, and may be, but is not limited to, extrusion and/or injection.

According to yet another exemplary embodiment of the present application, the resin blend may be prepared in a pellet by a melting process such as extrusion. For example, as described above, in the resin blend including the first and second resins, since the second resin has higher hydrophobicity than the first resin, the second resin is transferred to be in contact with the air, thereby forming a surface layer of the pellet, and the first resin is disposed in the center of the pellet, thereby forming a core. In addition, the resin blend may be extruded in a pellet, and then the pellet may be manufactured in a molded article by a melting process such as injection. Meanwhile, a molded article may be directly manufactured from the resin blend by a melting process such as injection.

In the melting process of the resin blend, temperatures may be changed according to the kinds of the first and second resins.

In the method of manufacturing the resin molded article, curing a resulting product obtained by melting the resin blend, that is, a melted product of the resin blend may be further included. The curing may be, for example, thermal curing or UV curing. In addition, it is obvious to those of ordinary skill in the art that chemical or physical treatment can be further performed.

Meanwhile, the method of manufacturing the resin molded article may further include preparing a second resin before melting the resin blend. The second resin may be selected according to the first resin as described above, and the selected second resin may provide a specific function, for example, high hardness to a surface layer of the resin molded article. To prepare the second resin, any general method of preparing a resin through polymerization of a monomer may be used, and the method may be, for example, bulk polymerization, solution polymerization, suspension polymerization or emulsion polymerization.

The preparation of the second resin may include dispersing a monomer including the hydrogen-binding donor and acceptor or other monomers in a reaction solvent as needed, blending at least one additive selected from the group consisting of a chain transfer agent, an initiator, and a dispersion stabilizer in the reaction solvent, and polymerizing the blend at 40° C. or more.

The reaction medium may be any medium known to be conventionally used to prepare a synthetic resin, a polymer, or a copolymer without limitation. As an example of such a reaction medium, methylethylketone, ethanol, methylisobutylketone, distilled water, or a mixture of at least two thereof may be used.

The chain transfer agent capable of being added to the reaction solvent may be, but is not limited to, an alkyl mercaptan such as n-butyl mercaptan, n-dodecyl mercaptan, tertiary dodecyl mercaptan, or isopropyl mercaptan; an aryl mercaptan such as phenyl mercaptan, naphthyl mercaptan, or benzyl mercaptan; a halogen compound such as carbon tetrachloride; or an aromatic compound such as an α-methylstyrene dimer or an α-ethylstyrene dimer.

The initiator may be a polymerization initiator known to be conventionally used in suspension polymerization, for example, a peroxide such as octanoyl peroxide, decanoyl peroxide, or lauroyl peroxide; or an azo-based compound such as azobisisobutyronitrile or azobis-(2,4-dimethyl)-valeronitrile without particular limitation.

The dispersion stabilizer capable of being included in the reaction medium may be, but is not limited to, an organic dispersing agent such as polyvinylalcohol, polyolefin-maleic acid, cellulose, or an inorganic dispersing agent such as tricalciumphosphate.

Details on the first and second resins, and the hydrogen-binding donor and acceptor are already described, and thus detailed descriptions will be omitted.

Meanwhile, according to yet another exemplary embodiment of the present application, a resin molded article may include a first resin layer; a second resin layer formed on the first resin layer; and an interface layer including first and second resins and formed between the first and second resin layers. Here, the second resin layer includes a second resin having hydrogen-binding donor and acceptor.

The resin molded article manufactured from a resin blend including a first resin and a second resin having a difference in physical properties from the first resin, and having the above-described hydrogen-binding donor and acceptor may be, for example, formed in a layer-separated structure in which a first resin layer is disposed inside and a second resin layer is formed on a surface of the resin molded article.

The structure of the resin molded article, that is, the structure in which the first resin layer and the second resin layer are divided by the interface layer, and the second resin layer is exposed to an outside, is not known in the conventional art but new. The structure can exclude a coating or painting process to enhance a surface characteristic, reduce production time and production costs, and increase productivity of the final product. Such a structure may not be formed by extruding or injecting a general resin, and the effects according to the structure are difficult to obtain.

Particularly, as the resin molded article uses the second resin including a hydrogen-binding donor and acceptor, a surface hardness of the resin molded article may be additionally increased.

The "first resin layer" may mainly include the first resin, may determine physical properties of the molded article, and may be disposed in the resin molded article. In addition, the "second resin layer" may mainly include the second resin, may be disposed to a circumference of the resin molded article, and may provide a specific function to a surface of the molded article.

Details on the first and second resins, and the hydrogen-binding donor and acceptor are already described, and thus the related descriptions will be omitted.

Meanwhile, the resin molded article may include an interface layer formed between the first and second resin layers and including a mixture of the first and second resins. The interface layer may be formed between the separated first and second resin layers to serve as a boundary surface, and include the mixture of the first and second resins. The mixture may have the first and second resins physically or chemically bound, and the first and second resin layers may be bound through such a mixture.

As described above, the resin molded article may include a structure in which the first and second resin layers are divided by such an interface layer, and the second resin layer is exposed to the outside. For example, the molded article may have a structure in which the first resin layer, the interface layer, and the second resin layer are sequentially stacked, and a structure in which the interface and the second resin are stacked to upper and lower sides of the first resin. In addition, the resin molded article may include a structure in which the first resin layer having various stereoscopic types, for example, spherical, circular, polygonal or sheet types is sequentially surrounded by the interface and the second resin layer.

The layer separation phenomenon shown in the resin molded article is caused by manufacturing the resin molded article by applying specific first and second resins having different physical properties. Such different physical properties include surface energy, melt viscosity, solubility parameters, and a glass transition temperature. Details on the difference in physical properties are described above.

Meanwhile, the first and second resin layers and the interface layer of a sample may be subjected to a low temperature impact test, and a fracture surface of the sample may be etched using THF vapor, and confirmed using SEM. The measurement of a thickness of each layer includes forming a smooth cross-section by cutting the sample with a diamond knife using microtoming equipment, and etching the smooth cross-section using a solution capable of more selectively dissolving the second resin than the first resin. The etched cross-sections vary in melted degree according to the contents of the first and second resins, and when the cross-section is seen at 45 degrees above a surface using SEM, the first and second resin layers, the interface layer, and the surface may be observed by the difference in shades, and thus the thickness of each layer may be measured. In the present application, as a solution selectively more easily dissolving the second resin, a 1,2-dichloroethane solution (10 vol %, in EtOH) is used, but any solution having a higher solubility of the second resin than the first resin is not particularly limited, and may be suitably selected according to the kind and composition of the second resin by one of ordinary skill in the art.

The interface layer may have a thickness of 0.01 to 95%, 0.1 to 70%, 0.1 to 50%, 5 to 50%, 10 to 50%, 15 to 50%, or 20 to 50% with respect to a total thickness of the second resin layer and the interface layer. When the interface layer has a thickness of 0.01 to 95% of the total thickness of the second resin layer and the interface layer, due to an excellent interface binding strength between the first and second resin layers, the both layer may not be peeled, and surface characteristics caused by the second resin layer may be considerably enhanced. On the other hand, when the interface layer is too much thinner than the second resin layer, due to a decreased binding strength between the first and second resin layers, the both layers may be peeled, and when the interface layer is too thick, an effect of the enhancement in surface characteristics caused by the second resin layer may be insignificant.

The second resin layer may have a thickness of 0.01 to 60%, 0.01 to 40%, 0.01 to 20%, 0.01 to 10%, 0.01 to 5% 0.01 to 3%, 0.1 to 3%, or 1 to 3% with respect to the total resin molded article. As the second resin layer has a thickness in a certain range, the enhanced surface hardness or scratch resistance may be provided to a surface of the molded article. When the thickness of the second resin layer is too small, it is difficult to sufficiently enhance the surface characteristic of the molded article, and when the thickness of the second resin layer is too large, mechanical properties of the first resin may be changed by reflecting mechanical properties of a functional resin itself to the resin molded article.

Details on the first and second resins, difference in physical properties between the first and second resins, and the hydrogen-binding donor and acceptor included in the second resin are already described, and related descriptions will be omitted.

Meanwhile, according to yet another exemplary embodiment of the present application, a resin molded article including a first resin layer and a second resin layer formed on the first resin layer may be provided. A first resin layer component is detected on a surface of the second resin layer by an infrared (IR) spectrophotometer, and the second resin layer includes a second resin having a hydrogen-binding donor and acceptor.

The structure of the molded article, that is, the structure in which the first resin layer component is detected on a surface of the second resin layer by an IR spectrophotometer is not known in the conventional art, but new, and generally, in a coating process, it is difficult to detect the first resin layer component on the surface of the second resin layer.

Here, the surface of the second resin layer refers to a surface exposed to an outside (e.g., the air), not to the first resin layer.

Details on the first and second resins, the difference in physical properties between the first and second resins, and the hydrogen-binding donor and acceptor introduced to the second resin are already described, and related descriptions will be omitted.

In addition, in the specification, the difference in physical properties between the first and second resins may refer to the difference in physical properties between the first and second resins or between the first and second resin layers.

In addition, according to yet another exemplary embodiment of the present application, an automobile part, a helmet, an electric appliance part, a spinning machine part, a toy, or a pipe including the resin molded article may be provided.

Advantageous Effects

According to the present application, a resin blend which can enhance mechanical properties and surface hardness of a molded article, and exhibit effects of reduction of a processing time, increase in productivity, and reduction of production costs without using an additional surface coating, a pellet, a method of manufacturing a resin molded article using the same, and a resin molded article manufactured thereby can be provided.

MODES OF INVENTION

The present application will be described in further detail with respect to Examples. Though the following Examples are merely provided to exemplify the present application, the scope of the present application is not limited to the following Examples.

Measurement of Glass Transition Temperature

A glass transition temperature was measured using a differential scanning calorimeter (DSC823e, Mettler-toledo). More specifically, an aluminum pan containing 1 mg of a first resin sample or a second resin sample is equipped to a measuring device, and a glass transition temperature was measured at −50 to 300° C. (10° C./min, 2 cycles).

Measurement of Surface Energy

According to the Owens-Wendt-Rabel-Kaelble method, a surface energy was measured using a drop shape analyzer (DSA100, KRUSS).

More specifically, the first or second resin was dissolved at 15 wt % in a methyl ethyl ketone solvent, and bar-coated on an LCD glass. In addition, the coated LCD glass was pre-dried in an oven at 60° C. for 2 minutes, and dried in an oven at 90° C. for 1 minute.

After drying (or curing), deionized water and diiodomethane were dropped 10 times on the coated surface, and contact angles were averaged. The average value was assigned to the Owens-Wendt-Rabel-Kaelble method, thereby obtaining a surface energy.

Measurement of Melt Viscosity

A melt viscosity was measured using a capillary rheometer 1501 (Gottfert). More specifically, after a capillary die was attached to a barrel, the first or second resin was poured to fill three times. In addition, a shear viscosity (pa*s) was measured at a shear rate of 100 to 1000 $s^{-1}$ and a processing temperature of 240° C.

Measurement of Solubility Parameter

There were several methods of measuring and calculating a solubility parameter, but calculation of the solubility parameter in Example and Comparative Example was performed at 25° C. using a van Krevelen method [refer to Bicerano, J. Prediction of polymer properties, third edition, Marcel Dekker Inc., NewYork (2002)]. The Van Krevelen method is a calculating method using a group contribution theory, and the solubility parameter is defined by the following Equation:

$$\delta \text{ (solubility parameter)} = \sqrt{e_{coh}} = \sqrt{\frac{E_{coh}}{V}}$$

In the Equation, $E_{coh}$ is cohesive energy, V is a molar volume, $e_{coh}$ is a cohesive energy density, and the $E_{coh}$ is defined as follows:

$$E_{coh}=10570.9\times(^{0}X^{v}-^{0}X)+9072.8\times(2\times^{1}X-^{1}X^{v})+1018.2\times N_{VKH}$$

In the Equation, $^{0}X$, $^{1}X$, $^{0}X^{v}$, and $^{1}X^{v}$ are connectivity indexes, $N_{VKH}$ is a correlation term, and each was calculated with reference to the known literature [refer to Bicerano, J. Prediction of polymer properties, third edition, Marcel Dekker Inc., NewYork (2002)].

Measurement of Polydispersity Index (PDI) and Weight Average Molecular Weight (Mw)

A PDI was measured by gel permeation chromatography (GPC), and conditions are as follows.

Device: 1200 series, Agilent Technologies
Column: two PLgel mixed Bs, Polymer Laboratories
Solvent: THF
Column temperature: 40° C.
Sample concentration: 1 mg/mL, 100 L injection
Standard: polystyrene (Mp: 3900000, 723000, 316500, 52200, 31400, 7200, 3940, 485)

As an analysis program, a ChemStation (Agilent Technologies) was used, and a weight average molecular weight (Mw) and a number average molecular weight (Mn) were measured by GPC, thereby calculating a PDI from weight average molecular weight/number average molecular weight (Mw/Mn).

Observation of Cross-Section

Samples of Examples and Comparative Examples were subjected to a low temperature impact test, a fracture surface of each sample was etched using THF vapor, and then a layer-separated cross-section was observed using SEM. Meanwhile, to measure thicknesses of a first resin layer, a second resin layer, and an interface layer, which are layer-separated, the samples of Examples and Comparative Examples were cut with a diamond knife using a microtoming device (Leica EM FC6) at −120° C. to obtain a smooth cross-section. A cross-section part of the sample including the smooth cross-section was immersed in a 1,2-dichloroethane solution (10 vol %, in EtOH) to etch for 10 seconds, and then cleaned with distilled water. The etched parts of the cross-sections varied according to contents of the first and second resins, and were observed using SEM. That is, the first and second resin layers and the interface layer could be observed according to a difference in shades when the cross-section was seen at 45 degrees above a surface, and each thickness could be measured.

Test for Measuring Pencil Hardness

Pencil hardness of surfaces of the samples of Examples and Comparative Examples were measured using a pencil harness tester (Chungbuk Tech) under a constant load of 500 g. The surface was scratched at 45 degrees while a standard pencil (Mitsubishi) was changed to 9H from 6B to observe surface variation (ASTM 3363-74). The measurement results are average values obtained from tests repeatedly performed five times.

Surface Analysis by IR Spectrophotometer

The analysis was performed using an UMA-600 IR microscope equipped with a Varian FTS-7000 spectrophotometer (Varian, USA) and a mercury cadmium telluride (MCT) detector, spectrum measurement and data processing were performed using a Win-IR PRO 3.4 software (Varian, USA), and conditions are as follows.

Germanium (Ge) ATR crystal having a refractive index of 4.0
Scan with a middle infrared spectrum from 4000 $cm^{-1}$ to 600 $cm^{-1}$ at spectral resolution of 8 $cm^{-1}$ through attenuated total reflection (ATR)
Internal reference band: carbonyl group of acrylate (C=O str., ~1725 $cm^{-1}$)
Proper component of first resin: butadiene compound [C=C str. (~1630 $cm^{-1}$) or =C—H out-of-plane vib. (~970 $cm^{-1}$)]

Peak strength ratios [$I_{BD}$(C=C)/$I_A$(C=O)] and [$I_{BD}$(out-of-plane)/$I_A$(C=O)] were calculated, and spectrum measurement was repeated five times on a different region in one sample, thereby calculating average values and standard deviations.

EXAMPLE 1

(1) Preparation of First and Second Resins and Measurement of Physical Properties As a first resin, a thermoplastic resin composed of 60 wt % of methylmethacrylate, 7 wt % of acrylonitrile, 10 wt % of butadiene, and 23 wt % of styrene was used. To prepare a second resin, 134 g of methylmethacrylate, 30 g of acrylamide, 30 g of hydroxyethylmethacrylate, and 6 g of perfluorohexylethylmethacrylate were input into a 1 liter reactor to dissolve. Subsequently, 375 g of methylethylketone and 125 g of ethanol were input as solvents to control a solid content to approximately 30 wt %. Subsequently, a temperature of the reactor was maintained at 65° C., and purged with nitrogen. After 30 minutes, 0.12 g of n-dodecyl mercaptan and 0.4 g of 2,2'-azobisisobutyronitrile were input, and a reaction was performed for 12 hours. Afterward, a reaction product was precipitated in distilled water, and cleaned. After performing the cleaning twice, a resulting product was dried at 70° C. for 24 hours, and thus a second resin (A) was prepared.

A difference in surface energy between the first resin and the second resin (A) was 3.5 mN/m, a difference in melt viscosity was 350 pa*s, a difference in solubility parameter was 0.5 $(J/cm^3)^{1/2}$, a weight average molecular weight of the second resin (A) measured by GPC was 100K (100,000), a PDI was 1.9, a glass transition temperature of the first resin was 70° C., and a glass transition temperature of the second resin (A) was 127° C.

(2) Preparation of Resin Blend and Measurement of Physical Properties 93 parts by weight of the first resin and 7 parts by weight of the second resin (A) were blended, and extruded using a twin screw extruder (Leistritz) at 220° C., thereby obtaining a pellet. In addition, the pellet was injected using an EC100Φ30 injector (ENGEL) at 210° C. to manufacture a resin molded article sample 1 having a thickness of 3200 μm. In the sample, a thickness of a second resin layer was 55 μm, a thickness of an interface layer was 27 μm, a pencil hardness was 2H, and a layer separation phenomenon was observed.

EXAMPLE 2

(1) Preparation of First and Second Resins and Measurement of Physical Properties A first resin was the same as Example 1, and a second resin (B) was prepared by the same method as described in Example 1, except that 30 g of methacrylamide was used instead of 30 g of acrylamide.

A difference in surface energy between the first resin and the second resin (B) was 4.2 mN/m, a difference in melt viscosity was 330 pa*s, a difference in solubility parameter was 0.4 $(J/cm^3)^{1/2}$, a weight average molecular weight of the second resin (B) measured by GPC was 100 K, a PDI was 2.0, and a glass transition temperature was 134° C.

(2) Preparation of Resin Blend and Measurement of Physical Properties

A sample 2 having a thickness of 3200 μm was manufactured by the same method as described in Example 1, except that the second resin (B) was used. In the sample, a thickness of a second resin layer was 64 μm, a thickness of an interface layer was 32 μm, a pencil hardness was 2.5H, and a layer separation phenomenon was observed. A peak strength ratio $[I_{BD}(C=C)/I_A(C=O)]$ had an average value of 0.0119 and a standard deviation of 0.0004, and a peak strength ratio $[I_{BD}(\text{out-of-plane})/I_A(C=O)]$ had an average of 0.413 and a standard deviation of 0.0026, which were measured by an IR spectrophotometer.

EXAMPLE 3

(1) Preparation of First and Second Resins and Measurement of Physical Properties A first resin was the same as Example 1, and a second resin (C) was prepared by the same method as described in Example 1, except that 164 g of methylmethacrylate, 30 g of hydroxyethylmethacrylate, and 6 g of perfluorohexylethyl methacrylate were used instead of 134 g of methylmethacrylate, 30 g of acrylamide, 30 g of hydroxyethylmethacrylate, and 6 g of perfluorohexylethyl methacrylate.

A difference in surface energy between the first resin and the second resin (C) was 5.1 mN/m, a difference in melt viscosity was 400 pa*s, a difference in solubility parameter was 0.7 $(J/cm^3)^{1/2}$, a weight average molecular weight of the second resin (C) measured by GPC was 100 K, a PDI was 1.9, and a glass transition temperature was 113° C.

(2) Preparation of Resin Blend and Measurement of Physical Properties

A sample 3 having a thickness of 3200 μm was manufactured by the same method as described in Example 1, except that the second resin (C) was used. In the sample, a thickness of a second resin layer was 43 μm, a thickness of an interface layer was 25 μm, a pencil hardness was 1.5 H, and a layer separation phenomenon was observed.

EXAMPLE 4

(1) Preparation of First and Second Resins and Measurement of Physical Properties A first resin was the same as Example 1, and a second resin (D) was prepared by the same method as described in Example 1, except that 164 g of methylmethacrylate, 30 g of acrylamide, and 6 g of perfluorohexylethyl methacrylate were used instead of 134 g of methylmethacrylate, 30 g of acrylamide, 30 g of hydroxyethylmethacrylate, and 6 g of perfluorohexylethyl methacrylate.

A difference in surface energy between the first resin and the second resin (D) was 4.7 mN/m, a difference in melt viscosity was 370 pa*s, a difference in solubility parameter was 0.6 $(J/cm^3)^{1/2}$, a weight average molecular weight of the second resin (D) measured by GPC was 100 K, a PDI was 2.1, and a glass transition temperature was 123° C.

(2) Preparation of Resin Blend and Measurement of Physical Properties

A sample 4 having a thickness of 3200 μm was manufactured by the same method as described in Example 1, except that the second resin (D) was used. In the sample, a thickness of a second resin layer was 41 μm, a thickness of an interface layer was 26 μm, a pencil hardness was 1.5 H, and a layer separation phenomenon was observed.

EXAMPLE 5

(1) Preparation of First and Second Resins and Measurement of Physical Properties A first resin was the same as Example 1, and a second resin (E) was prepared by the same method as described in Example 1, except that 144 g of methylmethacrylate, 20 g of vinylpyrrolidone, 30 g of hydroxyethylmethacrylate, and 6 g of perfluorohexylethyl methacrylate were used instead of 134 g of methylmethacrylate, 30 g of acrylamide, 30 g of hydroxyethylmethacrylate, and 6 g of perfluorohexylethyl methacrylate.

A difference in surface energy between the first resin and the second resin (E) was 3.7 mN/m, a difference in melt viscosity was 360 pa*s, a difference in solubility parameter was 0.5 $(J/cm^3)^{1/2}$, a weight average molecular weight of the second resin (E) measured by GPC was 100 K, a PDI was 2.0, and a glass transition temperature was 116° C.

(2) Preparation of Resin Blend and Measurement of Physical Properties

A sample 5 having a thickness of 3200 μm was manufactured by the same method as described in Example 1, except that the second resin (E) was used. In the sample, a thickness of a second resin layer was 45 μm, a thickness of an interface layer was 28 μm, a pencil hardness was 1.5 H, and a layer separation phenomenon was observed.

EXAMPLE 6

(1) Preparation of First and Second Resins and Measurement of Physical Properties A first resin was the same as Example 1, and a blend of the second resin (C) and the second resin (D) was used as a second resin.

A difference in surface energy between the first resin and the second resin was 4.9 mN/m, and a glass transition temperature of the second resin was 122° C.

The surface energy and glass transition temperature of the second resin were measured using a resin obtained by melting the second resin (C) and the second resin (D) in methylethylketone in 1:1, homogeneously blending the resins (C) and (D), and precipitating the blend using hexane.

(2) Preparation of Resin Blend and Measurement of Physical Properties

A sample 6 was manufactured by the same method as described in Example 1, except that 3.5 parts by weight of the second resin (C) and 3.5 parts by weight of the second resin (D) were used instead of 7 parts by weight of the second resin (A). In the sample, a pencil hardness was 2.5 H, and a layer separation phenomenon was observed.

EXAMPLE 7

(1) Preparation of First and Second Resins and Measurement of Physical Properties A first resin was the same as Example 1, and a second resin (F) was prepared by the same method as described in Example 1, except that 174 g of methylmethacrylate, 20 g of vinylpyrrolidone, and 6 g of perfluorohexylethylmethacrylate were used instead of 134 g of methylmethacrylate, 30 g of acrylamide, 30 g of hydroxyethylmethacrylate, and 6 g of perfluorohexylethyl methacrylate. As a second resin, a blend of the second resin (C) and the second resin (F) was used.

A difference in surface energy between the first resin and the second resin was 4.5 mN/m, and a glass transition temperature of the second resin was 115° C.

The surface energy and glass transition temperature of the second resin were measured using a resin obtained by melting the second resin (C) and the second resin (F) in methylethylketone in 1:1, homogeneously blending the resins (C) and (F), and precipitating the blend using hexane.

(2) Preparation of Resin Blend and Measurement of Physical Properties

A sample 7 was manufactured by the same method as described in Example 1, except that 3.5 parts by weight of the second resin (C) and 3.5 parts by weight of the second resin (F) were used instead of 7 parts by weight of the second resin (A). In the sample, a pencil hardness was 2 H, and a layer separation phenomenon was observed.

COMPARATIVE EXAMPLE 1

A sample 8 having a thickness of 3200 μm was manufactured by drying 100 parts by weight of a first resin pellet in an oven and injecting the dried pellet by an EC100Φ30 injector (ENGEL) at 210° C.

As the result of measuring physical properties of the sample 8 manufactured above, a glass transition temperature (Tg) was 70° C., and a pencil hardness was F.

COMPARATIVE EXAMPLE 2

(1) Preparation of First and Second Resins and Measurement of Physical Properties The same resin used in Example 1 was used as a first resin, and the second resin (F) was used as a second resin.

A difference in surface energy between the first resin and the second resin (F) was 4.1 mN/m, a difference in melt viscosity was 350 pa*s, a difference in solubility parameter was 0.5 $(J/cm^3)^{1/2}$, a weight average molecular weight of the second resin (F) measured by GPC was 100 K, a PDI was 1.9, and a glass transition temperature was 99° C.

(2) Preparation of Resin Blend and Measurement of Physical Properties

A sample 9 having a thickness of 3200 μm was manufactured by the same method as described in Example 1, except that the second resin (F) was used. In the sample, a thickness of a second resin layer was 35 μm, a thickness of the interface layer was 21 μm, a pencil hardness was H, and a layer separation phenomenon was observed.

COMPARATIVE EXAMPLE 3

(1) Preparation of First and Second Resins and Measurement of Physical Properties A first resin was the same as Example 1, and a second resin (G) was prepared by the same method as described in Example 1, except that 174 g of methylmethacrylate, 20 g of 4-acryloylmorpholine, and 6 g of perfluorohexylethyl methacrylate were used instead of 134 g of methylmethacrylate, 30 g of acrylamide, 30 g of hydroxyethylmethacrylate, and 6 g of perfluorohexylethyl methacrylate.

A difference in surface energy between the first resin and the second resin (G) was 4.2 mN/m, a difference in melt viscosity was 380 pa*s, a difference in solubility parameter was 0.5 $(J/cm^3)^{1/2}$, a weight average molecular weight of the second resin (G) measured by GPC was 100 K, a PDI was 1.9, and a glass transition temperature was 100° C.

(2) Preparation of Resin Blend and Measurement of Physical Properties

A sample 10 having a thickness of 3200 μm was manufactured by the same method as described in Example 1, except that the second resin (G) was used. In the sample, a thickness of a second resin layer was 33 μm, a thickness of an interface layer was 24 μm, a pencil hardness was H, and a layer separation phenomenon was observed.

COMPARATIVE EXAMPLE 4

A sample was manufactured by drying 100 parts by weight of the same first resin pellet as used in Example 1 in an oven and injecting the dried pellet by an EC100Φ30 injector (ENGEL) at 240° C.

A hard coating film was formed by forming a film by coating a self-prepared contamination resistant hard coating solution (17.5 wt % of dipentaerythritol hexylacrylate (DPHA), 10 wt % of pentaerythritol triacrylate (PETA), 1.5 wt % of perfluorohexylethyl methacrylate, 5 wt % of urethaneacrylate, EB 1290 produced by SK Cytech, 45 wt % of methyl ethyl ketone, 20 wt % of isopropylalcohol, and 1 wt % of a UV initiator, IRGACURE184 produced by Ciba) including a multifunctional acrylate with a Mayer bar #9 on the sample and drying the coated film at 60 to 90° C. for 4 minutes, and curing the coating solution composition through UV radiation with an intensity of 3,000 mJ/cm$^2$.

A pencil hardness of the hard coating film was 3H, and both of an average value and a standard deviation of peak strength ratios $[I_{BD}(C=C)/I_A(C=O)]$ and $[I_{BD}(out-of-plane)/I_A(C=O)]$ measured by an IR spectrophotometer were 0.

The invention claimed is:

1. A resin blend, comprising:
   a first resin; and
   a second resin including a hydrogen-binding donor and acceptor and having a difference in surface energy from the first resin at 25° C. of 0.1 to 35 mN/m,
   wherein the second resin has a higher glass transition temperature than the first resin, and a difference in glass transition temperature from the first resin of more than 30° C. to 150° C.,
   wherein the resin blend is capable of forming a layer-separated structure during a melt processing under a shear stress,
   wherein the second resin has a polydispersity index of 1 to 2.5,
   wherein the second resin is a (meth)acrylate-based resin comprising a (meth)acrylic monomer and a monomer selected from the group consisting of vinyl ether, a nitrogen-containing monomer, vinyl acetate, a hydroxyalkyl (meth)acrylate, a carboxyl group-containing monomer and a hetero cyclic compound in a polymerized form, and wherein the first resin is an ABS resin, and the ABS resin and the (meth)acrylate-based resin have a melt viscosity difference of 0.1 to 3000 pa*s at a shear rate of 100 to 1000 s$^{-1}$ and 210 to 240° C.

2. The resin blend according to claim 1, wherein the first resin and the second resin have a solubility parameter difference at 25° C. of 0.001 to 10.0 $(J/cm^3)^{1/2}$.

3. The resin blend according to claim 1, wherein the second resin has a weight average molecular weight of 30,000 to 200,000.

4. The resin blend according to claim 1, wherein the hydrogen-binding donor is an OH group, an $NH_2$ group, an NHR group, a COOH group, a $CONH_2$ group, an NHOH group, or an NHCO bond, an NH bond, a CONHCO bond, or an NH—NH bond, and R is an aromatic hydrocarbon, an aliphatic hydrocarbon, or a derivative thereof.

5. The resin blend according to claim 1, wherein the hydrogen-binding acceptor is an OH group, an OR group, an $NH_2$ group, an NHR group, an $NR_2$ group, a COOH group, a COOR group, a $CONH_2$ group, a $CONR_2$ group, an NHOH group, an NROR group, or an NHCO bond, an NRCO bond, an O bond, an NH bond, an NR bond, a COO bond, a CONHCO bond, a CONRCO bond, an NH—NH bond, an NR—NH bond, or an NR—NR bond, and R is an aromatic hydrocarbon, an aliphatic hydrocarbon, or a derivative thereof.

6. The resin blend according to claim 1, wherein the second resin has a glass transition temperature of more than 100° C.

7. A pellet having a layer-separated structure, comprising:
a core including a first resin; and
a shell including a second resin which has a hydrogen-binding donor and acceptor and a difference in surface energy from the first resin at 25° C. of 0.1 to 35 mN/m,
wherein the second resin has a higher glass transition temperature than the first resin, and a difference in glass transition temperature from the first resin of more than 30° C. to 150° C.
wherein the pellet is capable of forming the layer-separated structure during a melt processing under a shear stress,
wherein the second resin has a polydispersity index of 1 to 2.5,
wherein the second resin is a (meth)acrylate-based resin comprising a (meth)acrylic monomer and a monomer selected from the group consisting of vinyl ether, a nitrogen-containing monomer, vinyl acetate, a hydroxyalkyl (meth)acrylate, a carboxyl group-containing monomer and a hetero cyclic compound in a polymerized form, and wherein the first resin is an ABS resin, and the ABS resin and the (meth)acrylate-based resin have a melt viscosity difference of 0.1 to 3000 pa*s at a shear rate of 100 to 1000 $s^{-1}$ and 210 to 240° C.

8. A resin molded article, comprising:
a first resin layer including a first resin;
a second resin layer including a second resin formed on the first resin layer; and
an interface layer having the first resin and the second resin, and formed between the first and second resin layers,
wherein the second resin includes a polymer including hydrogen-binding donor and acceptor, and has a difference in surface energy from the first resin at 25° C. of 0.1 to 35 mN/m,
wherein the second resin has a higher glass transition temperature than the first resin, and a difference in glass transition temperature from the first resin of more than 30° C. to 150° C.,
wherein the resin article has a layer-separated formed from a resin blend comprising the first resin and the second resin during a melt processing of the resin blend under a shear stress,
wherein the second resin has a polydispersity index of 1 to 2.5,
wherein the second resin is a (meth)acrylate-based resin comprising a (meth)acrylic monomer and a monomer selected from the group consisting of vinyl ether, a nitrogen-containing monomer, vinyl acetate, a hydroxyalkyl (meth)acrylate, a carboxyl group-containing monomer and a hetero cyclic compound in a polymerized form and wherein the first resin is an ABS resin, and the ABS resin and the (meth)acrylate-based resin have a melt viscosity difference of 0.1 to 3000 pa*s at a shear rate of 100 to 1000 $s^{-1}$ and 210 to 240° C.

9. The resin molded article according to claim 8, wherein a first resin layer component is detected on a surface of the second resin layer by an infrared spectrophotometer.

10. A method of manufacturing a resin molded article, comprising:
forming a melt blend by melting the resin blend of claim 1; and
forming a layer-separated structure by processing the melt blend.

11. The method according to claim 10, wherein the melting and processing are performed under a shear stress.

12. The method according to claim 10, further comprising curing the layer-separated structure of the resin blend.

13. The method according to claim 12, wherein the curing is thermal curing or UV curing.

14. A method of manufacturing a resin molded article, comprising:
forming a melt blend by melting the pellet of claim 7; and
forming a layer-separated structure by processing the melt blend.

* * * * *